No. 736,794. PATENTED AUG. 18, 1903.
A. SIEMENS.
APPARATUS FOR CONTROLLING THE WORKING OF ELECTRICALLY DRIVEN CARS.
APPLICATION FILED FEB. 10, 1902.
NO MODEL. 5 SHEETS—SHEET 1.
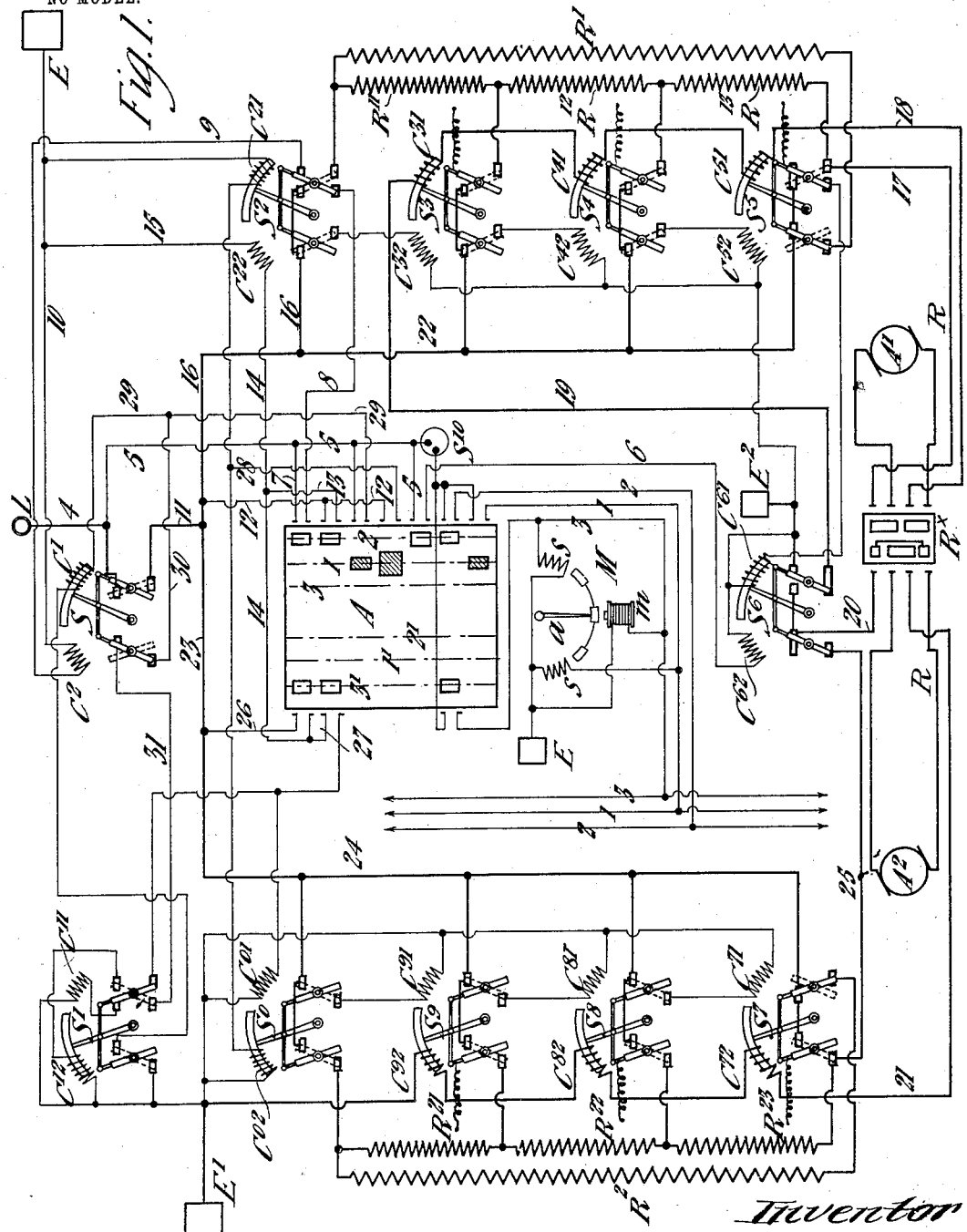
Witnesses:
James L. Norris, Jr.
N. L. Bogan
Inventor
Alexander Siemens
By
James L. Norris
Atty.

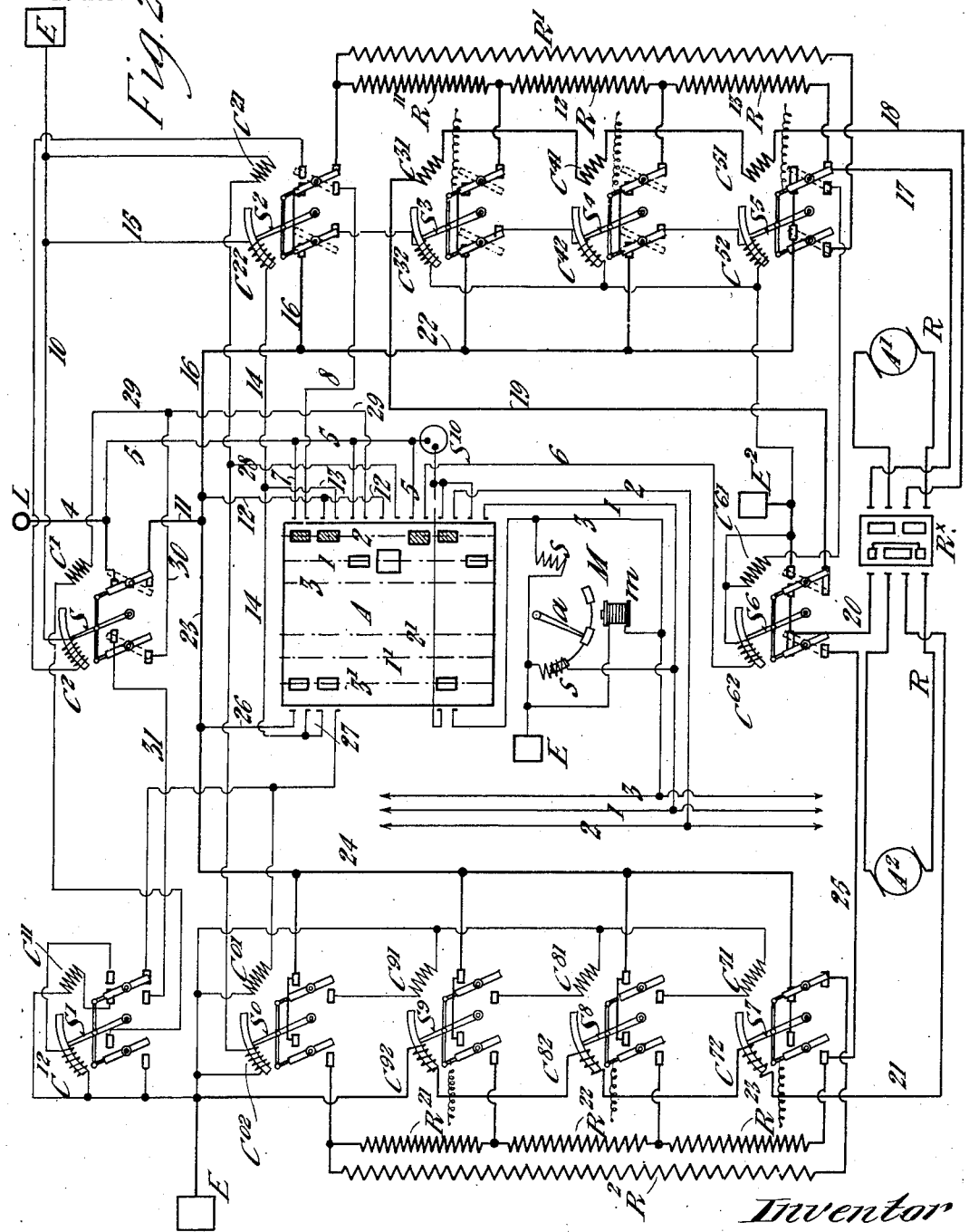

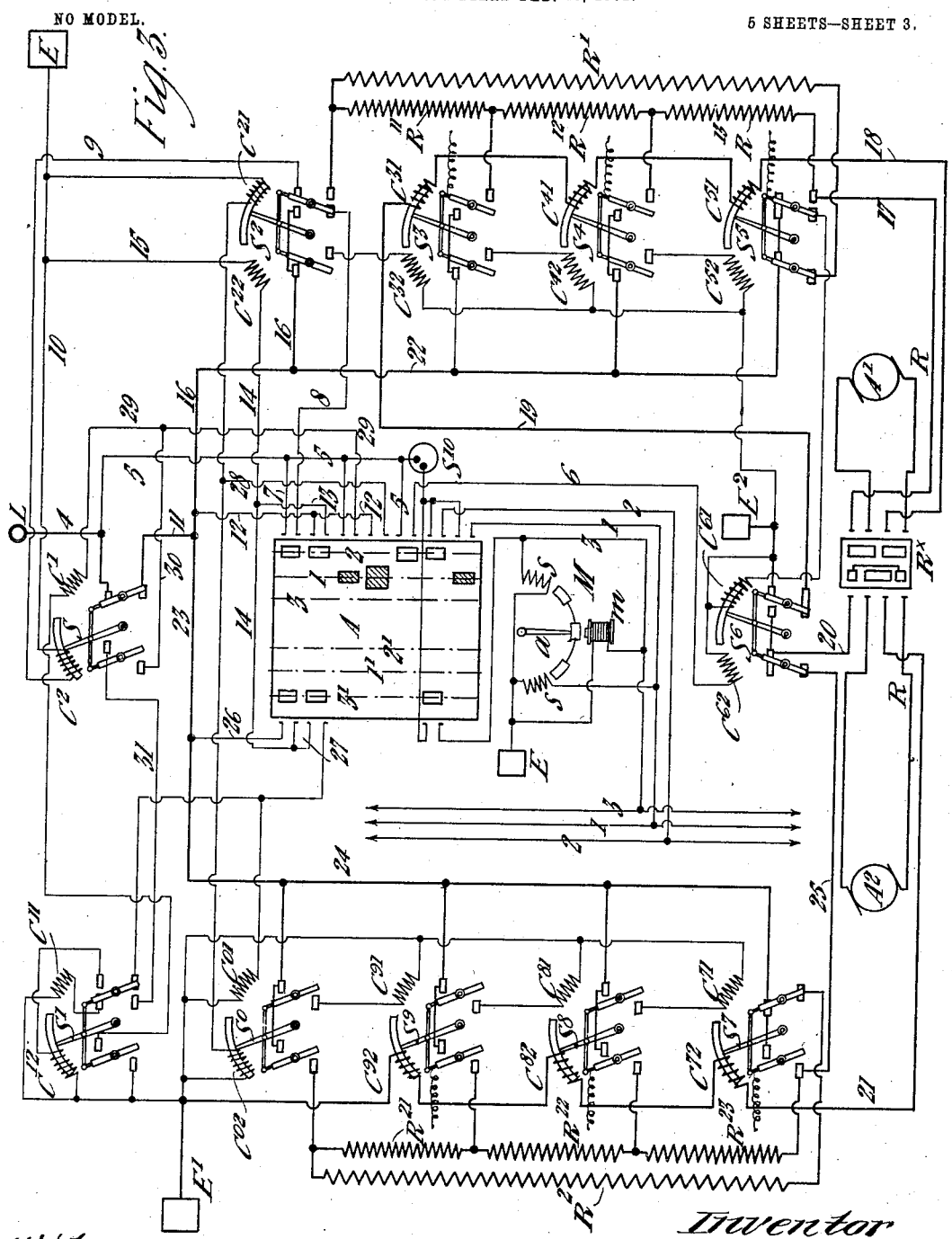

No. 736,794. PATENTED AUG. 18, 1903.
A. SIEMENS.
APPARATUS FOR CONTROLLING THE WORKING OF ELECTRICALLY DRIVEN CARS.
APPLICATION FILED FEB. 10, 1902.
NO MODEL. 6 SHEETS—SHEET 4.
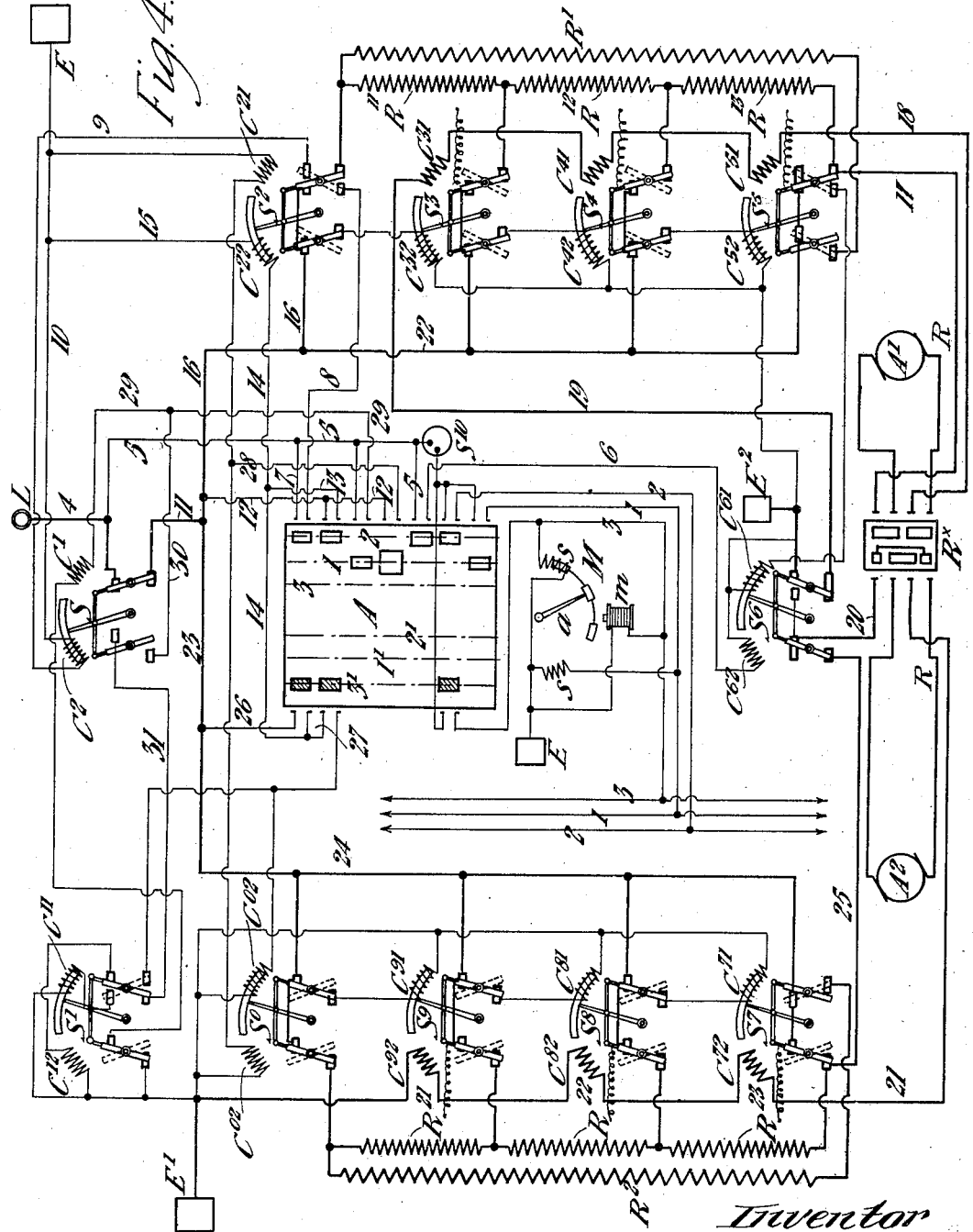

No. 736,794. PATENTED AUG. 18, 1903.
A. SIEMENS.
APPARATUS FOR CONTROLLING THE WORKING OF ELECTRICALLY DRIVEN CARS.
APPLICATION FILED FEB. 10, 1902.
NO MODEL. 5 SHEETS—SHEET 5.
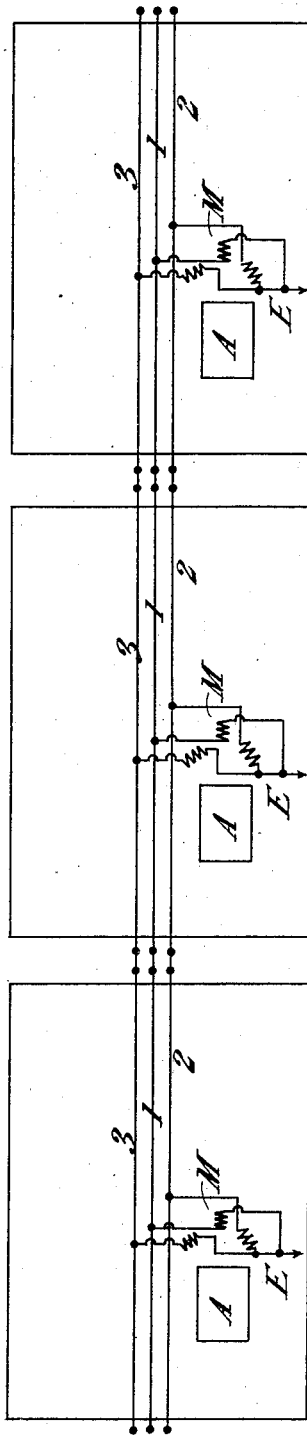

No. 736,794.

Patented August 18, 1903.

UNITED STATES PATENT OFFICE.

ALEXANDER SIEMENS, OF MILFORD, ENGLAND, ASSIGNOR TO SIEMENS BROTHERS & CO., LIMITED, OF WESTMINSTER, ENGLAND.

APPARATUS FOR CONTROLLING THE WORKING OF ELECTRICALLY-DRIVEN CARS.

SPECIFICATION forming part of Letters Patent No. 736,794, dated August 18, 1903.

Application filed February 10, 1902. Serial No. 93,454. (No model.)

*To all whom it may concern:*

Be it known that I, ALEXANDER SIEMENS, a citizen of England, residing at Westover, Milford-on-the-Sea, county of Hants, England, have invented certain new and useful Improvements in Apparatus for Controlling the Working of Electrically - Driven Cars, (for which a patent has been applied for in Great Britain, dated July 12, 1901, No. 14,236,) of which the following is a specification.

My invention relates to apparatus for controlling the working of electrically-driven cars so arranged that when several such cars are coupled together, forming a train, the driver, situated at the front, can by turning the cylinder of a controller determine the starting, stopping, reversing, and varying speed of the motors not only of his own car, but also of other cars of the train which have similar controlling-cylinders electrically coupled to the cylinder, which is operated by the driver. For this purpose I provide on each motor-car a set of special relay-switches and electrical connections, the arrangement and operation of which I shall describe, referring to the accompanying diagrams.

Figure 1 shows the position of the switches when no current is supplied to the motors. Fig. 2 is the position when the motors are started in series. Fig. 3 is the position of readiness for changing the grouping from series to parallel, and Fig. 4 is the position in which the motors are in parallel. Fig. 5 is a diagram illustrating the electrical connections of the motors M for the controllers A throughout a train of three cars.

There are two motors $A'$ $A^2$, and the connections of these and of the controller A with the corresponding parts on other cars are through the groups of wires marked R. On one side of the controller and pressing thereon are a number of fixed contacts. Diametrically opposite are a smaller number of similar contacts. Attached to the cylinder itself are ten metal pieces, all insulated from one another. For the sake of clearness these pieces are shown in outline or shaded, accordingly as they are disconnected from everything or are being used for completing circuits. Each of the switches $S$ $S^0$ $S'$ $S^9$, which are operated by this barrel-switch and control the electrical connections, has two definite positions, each switch having a lever-arm to which is attached an iron core that is attracted by the solenoids $C'$ $C^2$, &c. The switches $S^3$ $S^4$ $S^5$ $S^7$ $S^8$ $S^9$ are somewhat different from the others. In each of these switches one solenoid is traversed by a small current and is in a shunt-circuit across the line and earth, while the other solenoid is in series with one of the car-motors. If neither solenoid is carrying current, the switch is urged by a suitable spring into the position in which the iron core is in the series solenoid. The strength of the spring and the windings of the two solenoids are so adjusted that in the operation of starting the train by cutting out resistances when the current in one motor falls to a predetermined value the attraction of the shunt-solenoid overcomes the combined pull due to the spring and the series solenoid. Consequently when the current by the motor has fallen to such an extent that in order to maintain a uniform acceleration a certain amount of resistance must be cut out of circuit the switch is automatically pulled over and short-circuits one step of the resistance.

Figs. 1 and 2 show how the first part of the operation whereby the train is started is performed. In Fig. 2 the switches are shown in the positions they have attained when the motors are in series and all resistance is cut out, the dotted lines indicating the previous positions of those switches that have moved. The driver moves the controller A, and with it the similar controllers coupled with it throughout the train, so that the contact-fingers on the right touch the barrel-switch along the dotted line 2, Fig. 2, and the fingers on the left along the dotted line 2'. The lower four fingers on the right and the lower two on the left, in conjunction with switch $S^{10}$ and the wires 1, 2, and 3, are solely for the purpose of propagating the movement of the controller along the train. Excluding these, the first path open to the current is from L along wires 4, 5, and 6 through the solenoid $C^{62}$ to earth $E^2$. The solenoid $C^{62}$ being thus excited pulls over the switch $S^6$. From the line the current also goes via wires 4 5 7 8 through switch $S^2$ (which has not yet been moved) wire 9, solenoid $C^2$, wire 10 to earth E. This pulls over switch S, and thus connects the line L through wire 4 to wire 11. The next proceeding is to pull over switch $S^2$ by current from L through wires 4 11 12 13 14 through solenoid $C^{22}$, wire 15 to earth E. The circuit has now been prepared for the current to flow through the motors, the path being as follows: From the line through wires 4 11 16 through switch $S^2$, resistances $R^{11}$ $R^{12}$ $R^{13}$, wire 17, through reversing-switch $R^\times$ to motor $A'$, through wire 18, solenoids $C^{51}$ $C^{41}$ $C^{31}$, wire 19, switch $S^6$, wire 20, switch $R^\times$, motor $A^2$, wire 21, solenoids $C^{72}$ $C^{82}$ $C^{92}$ to earth $E'$. As the speed of the train increases the current in the motors falls, and as soon as it has fallen to the critical value, the solenoid $C^{32}$ being already excited, the switch $S^3$ automatically short-circuits resistance $R^{11}$, the main current passing through wire 22. In consequence of the movement of $S^3$ the solenoid $C^{42}$ is excited, so that when the current has again fallen to the critical value $S^4$ is pulled over, thus short-circuiting another step of the resistance and completing the circuit through $C^{52}$. The same process is repeated with $S^5$, so that finally all resistance is cut out and the full voltage of supply is applied to the two motors in series. Up to this stage none of the switches on the left of the diagram has been moved, and all the circuits, with the exception of the three series solenoids, are open. The next step in the switching on is to prepare the motors for being put in parallel and is the intermediate stage. (Shown in Fig. 3.) When the end of the first stage is reached, the driver moves the controller A to its original position, so that the fingers touch along the lines 1 and $1'$, respectively. This produces the following results: Current is cut off from the solenoids $C^{62}$ and $C^{22}$, but flows through $C^{21}$, so that $S^2$ is pulled over. The movement of $S^2$ opens the circuit of $C^{32}$, allowing $S^3$ to be pulled over by the main current, and in the same way $S^4$ and $S^5$ are pulled over in succession. The movement of $S^5$ produces two results—first, the four resistances $R'$ $R^{11}$ $R^{12}$ $R^{13}$ are reinserted in the main current through wire 22, and, secondly, the circuit of the solenoid $C^{61}$ is completed, so that $S^6$ is pulled over. The first step in the intermediate stage has been accomplished, and it only remains to trace out the method by which the motors are put in parallel with sufficient resistance in each circuit to safeguard the motors. This is effected by the movement of the switch $S^6$, already mentioned. The right-hand part of $S^6$ in moving over opens the connection between the two motors and connects the open end of motor $A'$ to earth, so that the circuit through this motor is as follows: from the line L through wires 4 11 16 22, resistances $R'$ $R^{11}$ $R^{12}$ $R^{13}$, wire 17, motor $A'$, wire 18, solenoids $C^{51}$ $C^{41}$ $C^{31}$, wire 19 to earth $E^2$. The left-hand part of switch $S^6$ completes the following circuit: from the line through wires 4 11 23 24, switch $S^7$, resistances $R^2$ $R^{21}$ $R^{22}$ $R^{23}$, wire 25, wire 20, motor $A^2$, wire 21, solenoids $C^{72}$ $C^{82}$ $C^{92}$ to earth $E'$. This completes the intermediate stage. So far none of the switches on the left of the diagram have been moved. For the final stage, Fig. 4, the driver operates his switch so that the controller A is moved to position 3—i. e., the contacts on the right touch the barrel along the dotted line 3, those on the left along the dotted line $3'$. This movement cuts off current from the solenoid $C^{21}$, so that the switch $S^2$ is now free to move. Current now flows from the line L through wires 4 11 23 26 27 14, solenoid $C^{22}$, wire 15 to earth E. This pulls over the switch $S^2$, thus cutting out resistance $R'$ and starting the process previously described, whereby the resistances $R^{11}$ $R^{12}$ $R^{13}$ are cut out step by step. In the same way the two switches $S'$ and $S^0$ are pulled over. The function of $S'$ is to prepare for switching off, so that current from the solenoid $C'$ may pass through the switch $S'$ to earth. The resistances $R^{21}$ $R^{22}$ $R^{23}$ are cut out of the circuit of motor $A^2$ by the switches $S^9$, $S^8$, and $S^7$ in precisely the same way as the resistances in the circuit of motor $A'$ are cut out by the corresponding switches. When the switches $S^5$ and $S^7$ are finally pulled over, the process of starting is complete, and the train is then allowed to run until it is time to switch off.

When the driver wishes to switch off, he turns the controller A back into position No. 1, so that the contacts touch along the dotted lines 1 and $1'$, Fig. 1. The first result of this is that the solenoids $C^{21}$ and $C^{22}$ are energized by the connecting together of the two wires 12 and 28, and the switches $S^2$ and $S^0$ are pulled over. Next the circuit is completed from the line through wires 4 5 29, solenoid $C'$, switch $S'$ to earth $E'$, and the switch S is thrown over. The current then flows from the line through wires 4 5 29 30, switch S, wire 31, switch $S'$, solenoid $C^{12}$ to earth $E'$ and pulls over switch $S'$. The main circuit is thus opened by the switch S, and all current being entirely cut off switches $S^3$, $S^4$, and $S^5$ on the one side and $S^7$, $S^8$, and $S^9$ on the other side resume their normal positions.

The controller A of each car is moved to one or other of its three positions simultaneously with those of the other cars of the train in the following manner: The driver in the front car moves his controller A to one of its positions, and thereby makes contacts not only for some of the electrical connections on his own car, but also for a motor M. This motor has an armature consisting of a radial arm $a$, having two curved arms, an electromagnet $m$, and two solenoids $s$ $s$. When the electromagnet $m$ is energized, but neither of the solenoids $s$, the armature keeps its middle position; but when the electromagnet $m$ is inert and either of the solenoids $s$ is energized then the armature is deflected to the one side or the other. This armature being fixed on the axis of each controller A, when one of them—say that in the front car—is moved from its middle position to either of its other two positions it makes a contact by which a current is transmitted, energizing one of the solenoids *s s* of the other motor M, causing their armature to move and turn the controller A to the same position as the first. In like manner all the controllers are moved back to the middle position and to the other side when the first is so moved. This method of moving a number of controllers simultaneously to locking position is well known, and therefore no claim is here made to this method of or apparatus for so moving the controllers. The motors M on the several cars of the train have their coils connected to one another and to the controller-contacts by wires 1 2 and to earth by wire 3, these three wires being connected throughout the train, as shown in Fig. 5.

Having thus described the nature of this invention and the best means I know of carrying the same into practical effect, I claim—

1. A system of control for a train of electrically-driven cars comprising a rotary controlling-cylinder and motor-circuits governed by the said rotary controller on each car, and a train-circuit governed by any one of the said rotary controllers and operating electromagnetic apparatus on each of the other cars adapted to move the rotary controllers on these cars in conformity with the movement of the governing rotary controller, substantially as described.

2. An apparatus for controlling the working of electrically-driven cars comprising a rotary controlling-cylinder operating or operated by an electrically-controlled three-position armature mounted on the axis of said cylinder, relay-switches having two definite positions, circuits and resistances controlled by the operation of these switches and connected by them to the controller and the car-motors, substantially as described.

3. An apparatus for controlling the working of electrically-driven cars comprising a pair of electric motors, a rotary controlling-cylinder, operating or operated by an electrically-controlled three-position armature mounted on the axis of said cylinder, relay-switches comprising in their construction a lever-arm carrying a curved core and solenoids for attracting the core, circuits and resistances controlled by the operation of these switches and connected by them to the controller and the motors, substantially as described.

4. An apparatus for controlling the working of electrically-driven motors, comprising a pair of electric motors, a rotary controlling-cylinder, two-position relay-circuit and resistance-switches, the latter provided with series and shunt coils acting differentially and urged by springs toward the position into which the series coils tend to pull them, and suitable electrical connections between the controller, switches, coils and motors.

In testimony whereof I have hereunto set my hand in presence of two subscribing witnesses.

ALEX. SIEMENS.

Witnesses:
OLIVER IMRAY,
GERALD L. SMITH.